United States Patent
Weiss et al.

(10) Patent No.: US 12,533,746 B2
(45) Date of Patent: Jan. 27, 2026

(54) BEAM MACHINING OF WORKPIECES

(71) Applicant: WSoptics technologies GmbH, Rettenbach am Auerberg (DE)

(72) Inventors: Christoph Weiss, Schongau (DE); Florian Sepp, Altenstadt (DE)

(73) Assignee: WSOPTICS TECHNOLOGIES GMBH, Rettenbach am Auerberg (DE)

( * ) Notice: Subject to any disclaimer, the term of this patent is extended or adjusted under 35 U.S.C. 154(b) by 1056 days.

(21) Appl. No.: 17/520,055

(22) Filed: Nov. 5, 2021

(65) Prior Publication Data
US 2022/0055149 A1 Feb. 24, 2022

Related U.S. Application Data

(63) Continuation of application No. PCT/EP2020/062952, filed on May 8, 2020.

(30) Foreign Application Priority Data

May 8, 2019 (EP) .................... 19173341

(51) Int. Cl.
*B23K 26/04* (2014.01)
*B23K 26/06* (2014.01)
(Continued)

(52) U.S. Cl.
CPC .......... *B23K 26/048* (2013.01); *B23K 26/364* (2015.10); *B23K 26/38* (2013.01);
(Continued)

(58) Field of Classification Search
CPC .... B23K 26/048; B23K 26/364; B23K 26/70; B23K 26/38; B23K 26/0626; B23K 26/0665; B23K 26/08; B23K 26/36
See application file for complete search history.

(56) References Cited

U.S. PATENT DOCUMENTS 5,093,548 A   3/1992   Schmidt-Hebbel
5,683,600 A   11/1997  Kelley et al.
(Continued)

FOREIGN PATENT DOCUMENTS

CN      1306467 A    8/2001
CN      101613180 A  12/2009
(Continued)

OTHER PUBLICATIONS

International Preliminary Report on Patentability in International Appln. No. PCT/EP2020/062952, mailed on Nov. 18, 2021, 15 pages (with English translation).
(Continued)

*Primary Examiner* — Elizabeth M Kerr
*Assistant Examiner* — Keith Brian Assante
(74) *Attorney, Agent, or Firm* — Fish & Richardson P.C.

(57) ABSTRACT

Methods, devices, apparatus, and systems are described for separating workpiece parts from workpieces using a focused machining beam. The methods include creating a trough in the workpiece using the focused machining beam, the trough being created along at least one section of a contour of the at least one workpiece part to be separated from the workpiece, altering a focal position of the machining beam such that the machining beam has a smaller beam diameter on the workpiece, and creating a gap in the workpiece using the machining beam with the altered focal position along at least one section of the contour of the at least one workpiece part to be separated from the workpiece. The gap is created at least partially within the trough.

16 Claims, 10 Drawing Sheets

(51) Int. Cl.
*B23K 26/08* (2014.01)
*B23K 26/36* (2014.01)
*B23K 26/364* (2014.01)
*B23K 26/38* (2014.01)
*B23K 26/70* (2014.01)

(52) U.S. Cl.
CPC .......... *B23K 26/70* (2015.10); *B23K 26/0626* (2013.01); *B23K 26/0665* (2013.01); *B23K 26/08* (2013.01); *B23K 26/36* (2013.01)

(56) References Cited

U.S. PATENT DOCUMENTS

| | | |
|---|---|---|
| 2002/0170891 A1 | 11/2002 | Boyle et al. |
| 2005/0006359 A1 | 1/2005 | Blakey |
| 2011/0198321 A1 | 8/2011 | Walter et al. |
| 2014/0151347 A1 | 6/2014 | Evangelista et al. |
| 2016/0096239 A1* | 4/2016 | Raichle .............. B23K 26/1436 219/74 |
| 2016/0152508 A1* | 6/2016 | Kumkar ................. B28D 1/221 65/355 |
| 2020/0009688 A1* | 1/2020 | Chainur ................ B23K 26/702 |
| 2020/0246903 A1* | 8/2020 | Radighieri ............. B23K 9/127 |
| 2021/0046577 A1* | 2/2021 | Ehling ................. B23K 11/163 |

FOREIGN PATENT DOCUMENTS

| | | |
|---|---|---|
| CN | 102896427 A | 1/2013 |
| CN | 103962734 A | 8/2014 |
| CN | 105081579 A | 11/2015 |
| DE | 102009026410 A1 | 3/2011 |
| WO | WO 2003/002289 A1 | 1/2003 |
| WO | WO 2007/085516 A1 | 8/2007 |
| WO | WO 2014/048539 A1 | 4/2014 |
| WO | WO 2015/106775 A1 | 7/2015 |

OTHER PUBLICATIONS

International Search Report and Written Opinion in International Appln. No. PCT/EP2020/062952, mailed on Jul. 24, 2020, 18 pages (with English translation).

* cited by examiner

BEAM MACHINING OF WORKPIECES

CROSS REFERENCE TO RELATED APPLICATIONS

This application is a continuation of and claims priority under 35 U.S.C. § 120 from PCT Application No. PCT/EP2020/062952, filed on May 8, 2020, which claims priority from European Application No. 19 173 341.9, filed on May 8, 2019. The entire contents of each of these priority applications are incorporated herein by reference.

TECHNICAL FIELD

The present disclosure is in the technical field of beam machining of metallic workpieces with a focused machining beam.

BACKGROUND

Commercially available laser cutting devices enable automated production of workpiece parts in large quantities and with high precision. The workpiece parts are cut out of a metallic workpiece using a laser beam. Advantageously, using the laser, holes can also be made in the workpiece parts to be cut out.

Depending on the type of laser cutting method used, cut edges produced by laser usually require complex mechanical post-processing. For example, the cut edges have to be rounded or prepped for subsequent machining by smoothing or roughening. This applies, for example, to the cut edges of holes in workpiece parts already cut out, which typically must be provided with a chamfer (countersink) if they are to be used for securing the workpiece parts, for example, by screwing or riveting. For this purpose, the holes are treated by machining, with appropriately shaped drills inserted in the holes and the holes are, for example, drilled out in a conical shape.

In the case of laser cutting with oxygen as the working gas, oxidation occurring at the cut edges is a further problem. Since oxide layers are usually difficult to paint, they must be removed with great effort by grinding. It is also problematic that, in the case of already galvanized workpieces, the zinc coating in the region of the cut edges is lost such that re-galvanization is necessary.

In principle, the post-processing of cut edges is very costly in terms of time and personnel, especially since it is also often done manually. In addition, the post-processing is cost-intensive such that the production of workpiece parts undesirably takes longer and costs more. This applies especially to the post-processing of the cut edge of holes.

SUMMARY

The present disclosure improves upon conventional methods by avoiding the need for mechanical post-processing of cut edges on workpiece parts that are already cut out, e.g., by rounding them or by creating countersinks (chamfers). Overall, the automated production of such workpiece parts using the methods and systems disclosed herein can be faster and more economical. In one aspect, the present disclosure features methods for beam machining workpieces by a focused machining beam. The methods described herein can be used in any process in which gaps for separating workpiece parts are created in a workpiece by a penetrating cutting beam (thermal cutting), for example, laser cutting or flame cutting. In some implementations, the methods according to the present disclosure are used in the laser cutting of a workpiece, where the machining beam is a laser beam and the beam machining is laser beam machining.

The term "workpiece" refers to a metallic component that can be flat or curved, and can have at least one flat section with a flat workpiece surface. The workpiece is, for example, a flat plate with two parallel flat workpiece surfaces. Beam treatment can be done on the entire plate or only in a sub-region of the plate. The workpiece can also be a tube having a square or rectangular tube cross-section that has at least one flat wall section and, for example, can be composed of a plurality of flat wall sections. Beam treatment can be done separately in each flat wall section.

During beam treatment, the workpiece can rest on a flat workpiece support. The workpiece has, opposite the beam head or facing the beam head, a flat (first) workpiece surface at which the machining beam is directed. The first workpiece surface can be irradiated directly by the machining beam. The first workpiece surface can define a plane. Facing away from the beam head, the workpiece has a second workpiece surface parallel to the first workpiece surface. The second workpiece surface cannot be irradiated by the machining beam. The flat workpiece support likewise defines a plane.

In the methods according to the present disclosure for the beam machining of a workpiece, the machining beam is guided by a beam head and emerges at a beam nozzle on its end. The machining beam is, as usual, in the form of a focused, rotationally symmetrical beam: with a central beam axis (axis of symmetry). During focusing, the machining beam is bundled by a focusing lens or a focusing mirror. The focus of the machining beam is defined by that point after the focusing lens or after the focusing mirror at which the machining beam has its smallest cross-section or the smallest beam diameter. The focal length indicates the distance of the main plane of the lens (or main plane of the mirror) from the focal point of an ideal, focused parallel beam. The smaller the focal length, the more focused the laser beam and the smaller the focus diameter, and vice versa.

An important parameter for the machining beam is the beam power, for example, measured in kW. The beam power describes the energy emitted in the form of radiation (e.g., measured in kJ) per second. As used here and in the following, the term "power density" (also called "intensity") indicates the power of the machining beam in relation to the irradiated area, for example, measured in $kW/mm^2$.

The beam diameter perpendicular to the beam axis at a respective point of the machining beam determines the power density of the machining beam at this point of the machining beam. The beam diameter is the diameter of the circular cross-sectional area of the machining beam perpendicular to the beam axis. The larger the beam diameter, the smaller the power density, and vice versa. In the region between the focusing lens or focusing mirror and the focus, the machining beam converges; after the focus, the machining beam diverges. Viewed in the direction of the beam propagation, the power density increases in the convergent region with increasing distance from the focusing lens or focusing mirror, has its highest value at the focus, and decreases in the divergent region with increasing distance from the focus.

The power density on the workpiece thus depends on the size of the irradiated area (beam spot on the workpiece), corresponding to the beam diameter at the point at which the machining beam strikes the workpiece. In the context of the present disclosure, "beam diameter on the workpiece" refers to the beam diameter perpendicular to the beam axis that the machining beam has when it strikes the workpiece. In the context of the present disclosure, "cross-sectional area on the workpiece" refers to the cross-sectional area perpendicular to the beam axis that the machining beam has when it strikes the workpiece.

The beam diameter on the workpiece depends on the focal position of the machining beam. The term "focal position" means the position of the focus relative to the workpiece, e.g., relative to the plane of the flat (first) workpiece surface at which the machining beam is directed, or also relative to the workpiece support. The focal position is, for example, the perpendicular (shortest) distance of the focus from the workpiece, for example, from the plane of the flat (first) workpiece surface at which the machining beam is directed, or from the workpiece support. By changing the focal position, the beam diameter on the workpiece can be changed. When the workpiece is situated in the divergent region of the beam cone (focus above the workpiece surface which the machining beam strikes), the beam diameter on the workpiece can be increased by increasing the distance between the focus and the workpiece, and vice versa.

Thus, by changing the beam diameter on the workpiece, the power density on the workpiece can be changed selectively. "Power density on the workpiece" means the power of the machining beam on the irradiated surface of the workpiece (beam spot). For example, in the case of lasers, the beam intensity outside the focus, relative to the cross-section, is not constant. Ideally, the power intensity has a Gaussian profile. In any case, the power density is relatively low toward the edge.

The beam head also serves to guide a working gas jet, which is typically, but not mandatorily, emitted from the same beam nozzle as the machining beam and can be guided coaxially with the machining beam. The working gas jet emerging from the beam nozzle is typically, but not mandatorily, in the form of a gas cone striking the workpiece. The beam head can also serve to guide a coating gas jet that is used to transport coating material. The beam head for guiding the machining beam can be moved relative to the workpiece in a (e.g., horizontal) plane parallel to the plane of the (first) workpiece surface, at which the machining beam is directed, as well as in a (e.g., vertical) direction perpendicular thereto.

The methods according to the present disclosure are used for beam machining of a workpiece, from which at least one workpiece part, usually a plurality of workpiece parts, is intended to be separated. The beam machining is done with a focused machining beam that is directed at the (first) workpiece surface, e.g., a flat workpiece surface, of the workpiece. The at least one workpiece part to be separated from the workpiece is defined by a contour (or outline) that delimits the workpiece part. The workpiece part can be separated from the workpiece if the workpiece is severed along a (closed) separation line following the contour. The workpiece part is a physical object that can be removed as a whole from the rest of the workpiece (also referred to as a "scrap skeleton").

According to the present disclosure, first, using the machining beam, at least one trough is created in the workpiece or in a first workpiece surface facing the beam head. The trough is created along at least one section of a contour of the at least one workpiece part to be separated from the workpiece. The trough can extend along the entire contour of the workpiece part. The trough can, however, also extend only over one or a plurality of sections of the contour of the workpiece part. The trough can, for example, have a plurality of sections along the contour of a workpiece part to be separated from the workpiece. During the creation of the trough, a beam axis of the machining beam is moved with at least one movement component parallel to the plane of the workpiece surface. In some examples, the beam axis of the machining beam is moved with two (e.g., mutually perpendicular) movement components parallel to the plane of the workpiece surface. In the case of a plurality of workpiece parts to be separated from the workpiece, multiple troughs can accordingly also be created along the contours of multiple workpiece parts, with a trough not mandatorily associated with each workpiece part. Workpiece parts along whose contour no trough is formed can also be separated from the workpiece. However, according to the present disclosure, at least one trough is created along the contour of a workpiece part to be separated. In principle, only a single trough extends in each case along the contour of the same workpiece part.

After the creation of the at least one trough, a focal position of the machining beam is changed such that the machining beam has a smaller beam diameter on the workpiece.

Then, a gap in the workpiece is created using the machining beam with the altered focal position along at least one section of the contour of the at least one workpiece part to be separated from the workpiece. The gap is created at least partially within the trough of the at least one workpiece part. During the creation of the gap, a beam axis of the machining beam is moved with two movement components (perpendicular to one another) parallel to the plane of the workpiece surface. The gap is created within the trough of the at least one workpiece part and, optionally, also outside the trough, with the gap outside the trough, e.g., continuing the gap within the trough.

In the case of a plurality of workpiece parts to be separated from the workpiece, multiple gaps in the workpiece are also accordingly created, where a trough is not mandatorily associated with each workpiece part along whose contour a gap is created. Workpiece parts along whose contour no trough is formed can also be separated from the workpiece. According to the present disclosure, however, a gap is created in each existing trough (and, optionally, extending beyond it). In the context of the present disclosure, each gap is contour-forming and extends along the contour of a workpiece part to be separated from the workpiece.

In principle, in each case only a single gap extends along the contour of a same workpiece part. The gap can extend along the entire contour of the workpiece part, with the workpiece part being completely cut out (or cut free) of the workpiece. The workpiece part can then be removed directly from the rest of the workpiece (scrap skeleton). The gap can, however, also extend only over one or a plurality of sections of the contour of the workpiece part and thus have multiple sections, e.g., the gap is interrupted. In some examples, a gap can be interrupted by one or a plurality of webs of small dimension (e.g., microjoints) that still connect the workpiece part to be separated from the workpiece to the rest of the workpiece (scrap skeleton). Such a microjoint can have, along the contour of the workpiece part, a dimension of 1.5 mm at most. Microjoints can be severed manually (for example, by breaking the workpiece part out from the workpiece). However, complete cutting out, e.g., cutting free, of a workpiece part by severing the microjoints using the machining beam is also possible.

As used here and in the following, the term "trough" refers to an indentation (depression) of the workpiece or of the flat (first) workpiece surface. The trough does not break through the workpiece. In contrast, the term "gap" refers to an opening or penetration of the workpiece. Since in the method according to the present disclosure, in addition to a separating machining of the workpiece to create a gap, a non-separating machining of the workpiece to create a trough also occurs, the term "machining beam" is used instead of "cutting beam."

During the creation of the at least one trough, a beam axis of the machining beam is moved with at least one movement component (e.g., horizontal) parallel to the plane of the (first) workpiece surface. In some embodiments, the movement of the machining beam during the creation of the at least one trough includes two mutually perpendicular movement components parallel to the plane of the (first) workpiece surface. Thus, according to the present disclosure, an elongated or longish trough is created with an extension or course, e.g., relative to the flat first workpiece surface, where the elongated trough is fundamentally different from a circular trough that is created by a stationary (e.g., locationally unchanged) machining beam.

The extent of a trough may be basically arbitrary, so long as it extends along at least one section of the contour of a workpiece part to be separated from the workpiece. For example, the trough can have a rectilinear course. In this case, during the creation of the trough, the machining beam can be moved along a rectilinear path (e.g., a straight line). It is equally possible and provided according to the present disclosure for the trough to have a non-rectilinear (curved) course. In this case, during the creation of the trough, the machining beam is moved along a non-rectilinear path (line). The trough can have a plurality of sections that extend in each case along the contour of a workpiece part, and is then an interrupted trough. However, the trough can also extend along the entire contour of a workpiece part and is then a closed trough.

During the creation of a gap, a beam axis of the machining beam is moved with two mutually perpendicular movement components parallel to the plane of the workpiece surface. Here, an elongated or longish gap with an extension (or course), e.g., relative to the flat first workpiece surface, is created. The elongated gap is fundamentally different from a circular hole that is created by a stationary (locationally unchanged) machining beam.

The course of a gap may be basically arbitrary, with the gap (a contour-forming gap, in the context of the present disclosure) always extending along the contour of a workpiece part. According to the present disclosure, the creation of a gap that is not contour-forming, for example, for piercing a cutting beam into the workpiece and moving the cutting beam toward or away from the contour of a workpiece part is not considered a gap in the context of the present disclosure. In any case, a gap is created within a trough but can, however, also be created outside the trough, e.g., in continuation of the gap within the trough. In some examples, the (contour-forming) gap within a trough follows the course of the trough. In some cases, during creation of the gap, the machining beam is moved along a path that is identical to or is equidistant from the path of the machining beam during creation of the trough.

According to a preferred embodiment of the methods according to the present disclosure, a closed gap is created along the contour of a workpiece part for cutting the workpiece part free. In some cases, a trough that extends along the contour of the workpiece part, for example, along the entire contour, is also provided. The trough and the gap can have in each case an annular course, with a disk-shaped workpiece part being cut free from the workpiece.

According to another embodiment of the methods according to the present disclosure, a gap interrupted by at least one (connecting) web is created along the contour of the workpiece part. In some cases, for separating the workpiece part from the workpiece, the at least one web is severed using the machining beam, although it is equally possible to burn through (or sever) the at least one web in another way, for example, by breaking the workpiece part out of the workpiece.

If a trough is associated with a workpiece part, e.g., if a trough extends along at least one section of the workpiece part, a part of the trough is always situated on the workpiece part separated from the workpiece, with the other part of the trough remaining on the rest of the workpiece (scrap skeleton). The workpiece part separated from the workpiece can be a good part, where the part of the trough arranged thereon is, for example, a deliberately formed chamfer. However, it is also possible for the workpiece part to be discarded as a waste part. By separating the workpiece part from the workpiece, an opening or hole is created in the rest of the workpiece (scrap skeleton), the limiting edge of which has the other part of the trough. After separating a workpiece part from the workpiece, the workpiece part has a trough section (part of the trough). A further trough section (part of the trough) remains on the rest of the workpiece (scrap skeleton). In some cases, the trough section remaining on the workpiece and/or on the workpiece part after separating a workpiece part from the workpiece is in the form of a chamfer.

For example, one or a plurality of openings (holes) can be created within a (first) workpiece part to be separated from the workpiece, with a further (second) workpiece part being removed from the workpiece for each hole. Troughs can be associated with the second workpiece parts in each case, with a trough extending at least along a section of the contour, e.g., completely along the contour, of a second workpiece part. The holes created within the first workpiece part by removing the second workpiece parts can have, in each case, a part of the trough, which is, for example, in the form of a chamfer. In this way, a (first) workpiece part having one or a plurality of holes with chamfers can be produced simply, economically, and quickly. A trough does not mandatorily have to be associated with the first workpiece.

In the methods according to the present disclosure, a plurality of workpiece parts are to be separated from the workpiece. According to the present disclosure, various process designs are possible and provided. Thus, for example, immediately after the creation of a trough, a gap can also be created within (and, optionally, also outside) the trough. This means that the creation of the gap in the trough immediately follows the creation of the trough. However, it is also possible, initially, during a first period of time, for a plurality of troughs to be created immediately one after another, followed by creation of a plurality of gaps within a second period of time following the first period of time, with a (single) gap being created inside (and, optionally, also outside) a trough already created in each case. No gap is created during the first period of time and no trough is created during the second period of time.

The machining beam for creating a trough and the machining beam for creating a gap have different focal positions from one another. The focal position of the machining beam can be changed such that the beam diameter on the workpiece during creation of a gap is smaller than during creation of a trough. In other words, during creation of a trough, the beam diameter on the workpiece is greater than during creation of a gap. The focal position of the machining beam is changed before a gap is created, and the gap is created with the altered focal position.

By changing the beam diameter on the workpiece due to a change in the focal position it is possible to make the power density on the workpiece during creation of a trough less than the power density on the workpiece during creation of a gap. The focal position can be adjusted as desired by moving the beam head perpendicular to the workpiece support or perpendicular to the flat (first) workpiece surface and changed such that there is suitable power density on the workpiece to create a trough or a gap. The beam head can be moved vertically. If the workpiece is situated in the divergent region of the machining beam (focus is above the workpiece or the flat (first) workpiece surface), the beam diameter on the workpiece can be reduced by moving the beam head toward the workpiece (the distance between the beam head and the workpiece is reduced). Conversely, by moving the beam head away from the workpiece (the distance between the beam head and the workpiece or the flat (first) workpiece surface is increased), the beam diameter on the workpiece can be increased. During creation of a gap, the focus is typically situated near or inside the workpiece. During creation of a trough, the focus typically has a substantially greater distance from the workpiece. In addition, or as an alternative, to moving the beam head, the focal position of the machining beam can be changed optically.

In some examples, the power density of the machining beam on the workpiece for creating a trough is less than 50%, less than 40%, less than 30%, less than 20%, less than 10%, or even less than 1% of the power density of the machining beam on the workpiece for creating a gap. This difference in the power density is reflected in a change in the beam diameter or the circular cross-sectional area on the workpiece. In some examples, the cross-sectional area on the workpiece for creating a gap is less than 50%, less than 40%, less than 30%, less than 20%, less than 10%, or even less than 1% per cross-sectional area on the workpiece for creating a trough. For the beam diameter on the cross-section, the values indicated apply analogously, taking into account the fact that the cross-sectional area is the product of the squared half beam diameter times pi ($\pi$).

In currently common laser cutting devices, the beam diameter on the workpiece during the separating machining is about $\frac{1}{10}$ to $\frac{5}{10}$ mm. To create a trough using a laser beam, the beam diameter according to the present disclosure can be at least 1.5 mm and can be, for example, in the range from 3 to 25 mm. Accordingly, the width of a trough (e.g., the shortest dimension of the trough in a direction perpendicular to the extension of the trough) can be at least 3 mm and can be, for example, in the range from 4 to 15 mm.

In the method according to the present disclosure, a gap is created within (and, optionally, also outside) at least one trough. In the perpendicular view through the workpiece or through the flat (first) workpiece surface irradiated by the machining beam, the gap is situated, for example, completely within the trough. The perpendicular view through the plane of the flat (first) workpiece surface corresponds to a projection of the gap and trough in the plane of the (first) workpiece surface. However, the gap can also be situated outside the trough, e.g., as a continuation of the gap inside the trough.

A trough can be delimited by a trough edge. The trough edge is the region of the workpiece in which the trough begins to deepen. The gap situated within the trough can have a non-zero distance from the trough edge, at least relative to a direction perpendicular to the extension of the elongated trough. It goes without saying that the gap passes through the trough edge when it continues beyond the trough. When the gap is situated entirely within the trough, the gap can have (e.g., over the entire circumference) a non-zero distance from the trough edge. The trough can deepen toward the gap.

The gap can have a lowest position within the trough. The gap can be arranged, so to speak, at the bottom of the trough.

In some examples, the gap has a centered position within the trough, at least relative to a direction perpendicular to the extension of the elongated trough. If the gap is completely within the trough, this applies over the entire circumference, with the distance of the gap from the trough edge always constant all the way around the gap.

In some examples, in a perpendicular view through the flat (first) workpiece surface, at least relative to a direction perpendicular to the extension of the elongated trough, a shortest distance between the gap and the trough edge delimiting the trough can be at least 0.5 mm, e.g., at least 1 mm, and can be, for example, in the range from 0.5 mm to 10 mm. During creation of the gap within the trough, the beam spot (irradiated area on the workpiece) can be only within the trough and be spaced away from the trough edge. If a hole with a surrounding chamfer is created in the workpiece by forming at least one closed gap (e.g., an annular gap) within a trough, the hole including surrounding chamfers can have a diameter of at least 6 mm, which is, for example, in the range from 8 to 30 mm. The hole itself can have a diameter of at least 1 mm.

In the method according to the present disclosure, at least one trough and a gap at least partially within the trough are created in temporal succession in the workpiece. This temporal sequence has the advantage that the gap cannot be adversely affected by material removed during the creation of the trough. If the trough is created after the gap, the result is that material removed from the trough is injected into the gap. This can advantageously be avoided according to the present disclosure.

A trough can be designed as a rounding of the gap edge and, for example, as a chamfer of the cut edge of the gap. In accordance with common usage, the term "chamfer" refers to a widening of the gap toward the workpiece surface, in other words, a depression of the workpiece surface. A trough can be designed as an inclined surface, for example, an at least approximate conically widening inclined surface, with, in principle, any shape of the trough surface being possible (conical, concave, and/or flat).

The method according to the present disclosure enables the creation of gaps within troughs in a particularly simple and fast manner. As already stated, in some cases, before the separation of a workpiece part, a trough can be created within the workpiece part along at least one section of a contour of at least one additional workpiece part, and a gap can be created at least within the trough. If closed gaps, e.g., annular gaps, are created, a part (inner slug) is in each case cut free out of the workpiece such that holes are created in the workpiece. The holes are in each case surrounded by the part of the trough remaining on the rest of the workpiece (scrap skeleton). In this manner, holes with trough sections formed, for example, as chamfers, can be produced by the machining beam quickly and efficiently within a workpiece part to be separated from the workpiece. A different complex mechanical post-processing of the cut edges of the holes in the separated workpiece can be dispensed with such that the production of workpiece parts with holes having chamfers can be done more quickly, more economically, and more efficiently.

Another embodiment of the present disclosure accordingly relates to methods in which one or a plurality of holes, which are in each case completely or partially surrounded by a trough section forming, e.g., a chamfer for the hole, are created in a workpiece part to be separated from the workpiece. A trough is not mandatorily associated with the workpiece part itself, which is to be separated and is provided with one or a plurality of holes; in other words, a trough does not mandatorily have to extend along its contour.

The troughs and gaps for creating the holes are made in the workpiece part in each case before it is separated, e.g., cut free, from the scrap skeleton. This means that a workpiece part is not separated from the workpiece, e.g., completely cut out of the workpiece (cut free) until after the associated troughs and gaps for creating the holes within the workpiece part have already been formed. For example, a workpiece part is not cut free until the associated holes with chamfers have been formed. With the methods according to the present disclosure, there is thus no machining of a workpiece part that has already been cut free; in other words, with the method according to the present disclosure, no holes are created in workpiece parts already separated, e.g., cut free, from the workpiece.

If a gap is created after creating a trough, the beam diameter on the workpiece is suitably adjusted (i.e., reduced) to create the gap by changing the focal position. The focal position can be adjusted by moving the beam head perpendicular to the workpiece support or perpendicular to the flat (first) workpiece surface, thus reducing a working distance between the beam head and the workpiece. If a trough is created after creating a gap, the beam diameter on the workpiece is suitably adjusted (i.e., increased) to create the trough in an analogous manner by changing the focal position. The focal position can be adjusted by moving the beam head perpendicular to the workpiece support or perpendicular to the plane of the (first) workpiece surface, thus increasing a working distance between the beam head and the workpiece.

In the method according to the present disclosure, the shape of a trough created is not predetermined by the beam geometry since the machining beam is moved during creation of the trough such that an elongated trough is always created. The shape of the trough is thus different from the beam geometry. Correspondingly, the shape of a gap situated within (and, optionally, also outside) the trough is not predetermined by the beam geometry since the machining beam is also moved during creation of the gap such that, according to the course of the trough, an elongated gap can be created. The shape of the gap can thus also be different from the beam geometry.

In the methods according to the present disclosure, a trough and/or a gap can be created by a machining beam in continuous wave operation. In other words, the machining beam is not switched off during the creation of the trough and/or gap.

When creating a gap, the workpiece can be machined in a separating manner, with the machining beam having a power density on the workpiece that is dimensioned (or adjusted) such that the workpiece is completely severed. The machining beam (e.g., laser beam) interacts with a working gas jet directed at the kerf. As result of the use of oxygen as the working gas, the power density absorbed by the workpiece can be increased. To create the gap, the machining beam (e.g., laser beam) can first be pierced into the workpiece. In the context of the present disclosure, this piercing is not to be regarded as creating a gap.

According to another embodiment of the method according to the present disclosure, a power density of the machining beam is changed during the creation of one and the same trough. This measure enables selective adjustment of the depth and/or the shape of the trough. A change in the power density during the creation of the trough can be caused by a change of the beam diameter on the workpiece as a result of a change of the focal position. In some examples, the height of the beam head above the workpiece or the plane of the (first) workpiece surface is changed for this purpose during the creation of the trough, e.g., the beam head is moved with a movement component perpendicular to the plane of the (first) workpiece surface (e.g., in a vertical direction). The change of the focal position during the creation of the trough is only one possibility for changing the power density of the machining beam on the workpiece. Other possibilities are known to the person skilled in the art, e.g., a change in the type and composition of the working gas.

The beam axis of the machining beam can be perpendicular to the flat workpiece support or perpendicular to the plane of the irradiated (first) workpiece surface during the creation of the trough and gap, e.g., the angle between the beam axis and the workpiece support is 90°. This brings with it advantages in terms of control technology. In addition, costs for the technical implementation of a corresponding swiveling capability of the machining beam relative to the plane of the workpiece support can be saved.

However, it is also conceivable for the beam axis to be changed during the irradiation of the workpiece, with the beam axis at least temporarily assuming an angle other than 90° relative to the workpiece support or to the plane of the irradiated (first) workpiece surface during the creation of a gap and/or during the creation of a trough. The orientation of the machining beam can be achieved through pivotability of the beam head (mechanically) and/or pivotability of the machining beam (optically). For example, by pivoting the machining beam during the creation of the trough, a larger area of the workpiece can be swept, which can be advantageous.

According to another embodiment of the methods according to the present disclosure, a post-processing of the gap and/or the trough is carried out by the machining beam. For this post-processing, the machining beam has a power density on the workpiece that is dimensioned (or adjusted) such that the workpiece is not cut through, e.g., no perforation is created in the workpiece. Instead, the power density is dimensioned (or adjusted) such that the workpiece is machined in a non-severing and non-joining manner. Various applications in the post-processing of a gap and/or a trough are possible and provided. The gap and the trough can be machined together.

In one application, an oxide layer created by the working gas oxygen is removed in the region of the trough and/or the gap. In another application, burr (e.g., microburr) is removed in the region of the trough and/or the gap. The burr can be situated on the (second) workpiece surface, which faces away from the machining beam. In another application, the workpiece is heat-treated, for example, hardened or soft annealed. In another application, the trough and/or the gap is provided with a coating (e.g., zinc coating). This can be done in a simple manner by adding a substance creating the coating (e.g., zinc) to a coating gas jet. The coating gas jet is different from the working gas jet guided coaxially with the machining beam. As a result of this measure, it is possible to thermally separate workpieces that have already been coated in a particularly advantageous manner. Any subsequent coating outside the beam machining can be unnecessary.

The method according to the present disclosure for the beam machining of a workpiece is not limited to the applications described above. Instead, numerous other applications are conceivable. In the post-processing of the workpiece, the above-described applications as well as other applications can be implemented individually or in any combinations.

According to one embodiment of the methods according to the present disclosure, a second trough in the non-irradiated (second) surface of the workpiece is created through the gap using the machining beam. The focal position and the power density on the workpiece are suitably adjusted for this purpose. In this way, a gap can, for example, be provided with a respective chamfer on both workpiece surfaces of the workpiece.

The present disclosure further provides a beam machining device having a machining beam guided by a beam head for the beam machining of, for example, a plate-shaped or tubular workpiece, that has an electronic control device for controlling/regulating the beam machining of the workpiece, which is (programmatically) set up to carry out the method according to the present disclosure.

The present disclosure further provides a program code for an electronic control device suitable for the data processing for such a beam machining device, which includes control commands that cause the control device to carry out the method according to the present disclosure.

Furthermore, the present disclosure provides a computer program product (storage medium) having a stored program code for an electronic control device suitable for the data processing for such a beam machining device, which includes control commands that cause the control device to carry out the method according to the present disclosure.

The aforementioned embodiments of the present disclosure can be used in isolation or in any combination without departing from the scope of the present disclosure.

DESCRIPTION OF DRAWINGS

The present disclosure is now explained in detail using exemplary embodiments and referring to the accompanying figures.

DETAILED DESCRIPTION

Figure 1:
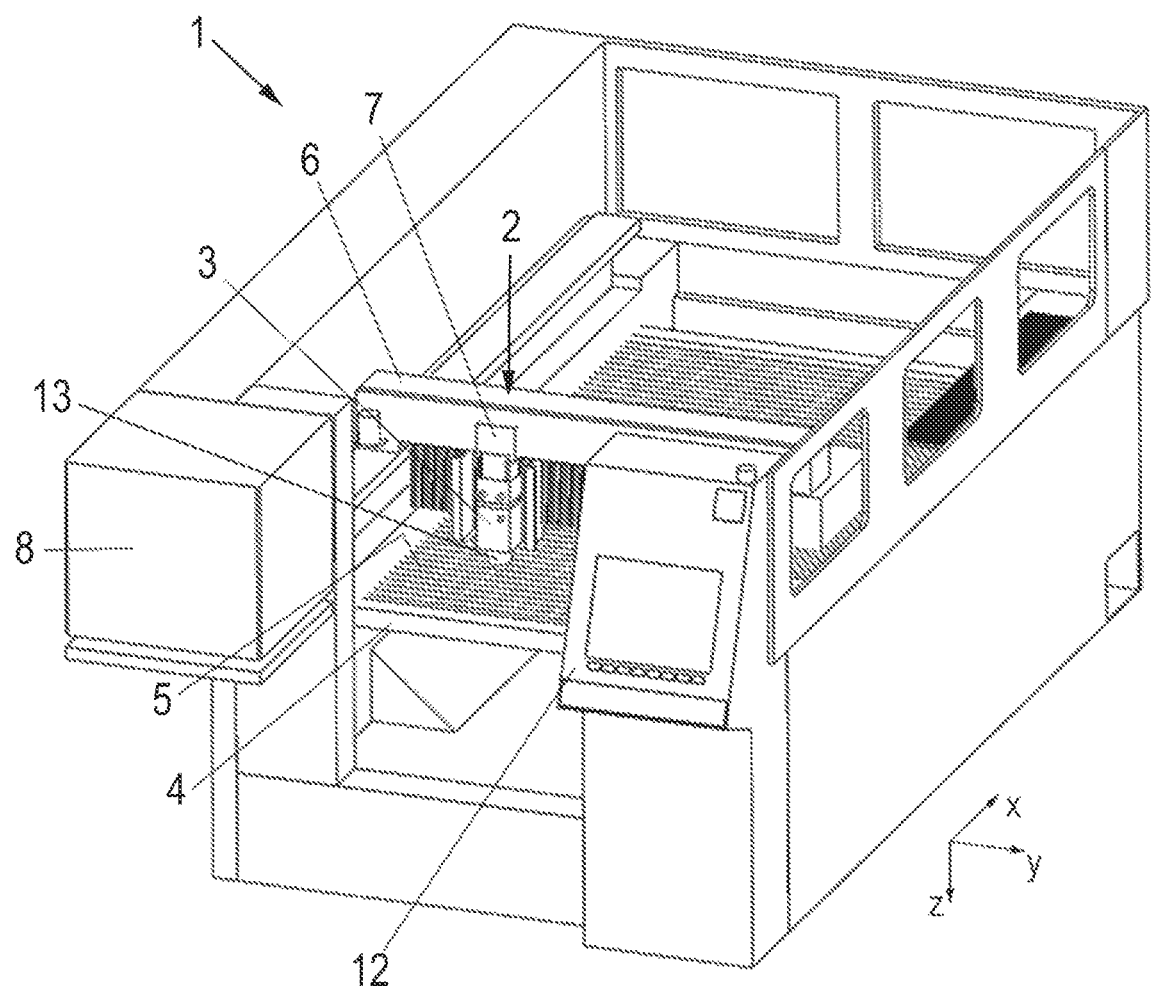
FIG. 1 is a schematic representation of an exemplary beam machining device for carrying out the method according to the present disclosure for beam machining of a workpiece.

FIG. 1 shows a beam machining device known per se for beam cutting of plate-like workpieces. The beam machining device referenced as a whole with the reference character 1 includes a beam cutting device 2 having a beam head 3, as well as a workbench 4 having a flat workpiece support 5 for a workpiece 9 (not shown in FIG. 1, see FIGS. 2 to 6), for example, a flat metal sheet. The workpiece support 5 is spanned by a cross member (e.g., a cross mover) 6, which is guided to be movable along a first axial direction (x direction).

A guide carriage 7 for the beam head 3 is mounted on the cross member 6, which is guided to be movable on the cross member 6 along a second axial direction perpendicular to the first axial direction (y direction). The beam head 3 can thus be moved in a plane spanned by the two axial directions (x, y directions) parallel to and relative to, for example, the horizontal workpiece support 5. The beam head 3 is further designed (or configured) to be vertically movable in a third axial direction (z direction) perpendicular to the first and second axial directions, by which the distance perpendicular to the workpiece support 5 or the workpiece 9 can be changed. In the case of a horizontal workpiece support 5, the z direction corresponds to the direction of gravity. The beam head 3 has, on its side facing the workpiece support 5, a beam nozzle 13 tapering conically toward the workpiece support 5. The beam head 3 serves to guide a machining beam 14 (see, for example, FIG. 2), here, for example, a laser beam, as well as a working gas jet 15 (not shown in detail in the figures).

The machining beam 14 is generated by a machining beam source 8 and guided, for example, to the beam head 3 by a beam guiding tube and several deflection mirrors or a light guide cable. Via a focusing lens or adaptive optics, the machining beam 14 can be directed onto the workpiece in bundled form (e.g., focused). Due to the movability of the beam head 3 along the first axial direction (x direction) and in the second axial direction (y direction), any point on the workpiece 9 can be approached with the machining beam 14.

Figure 2:
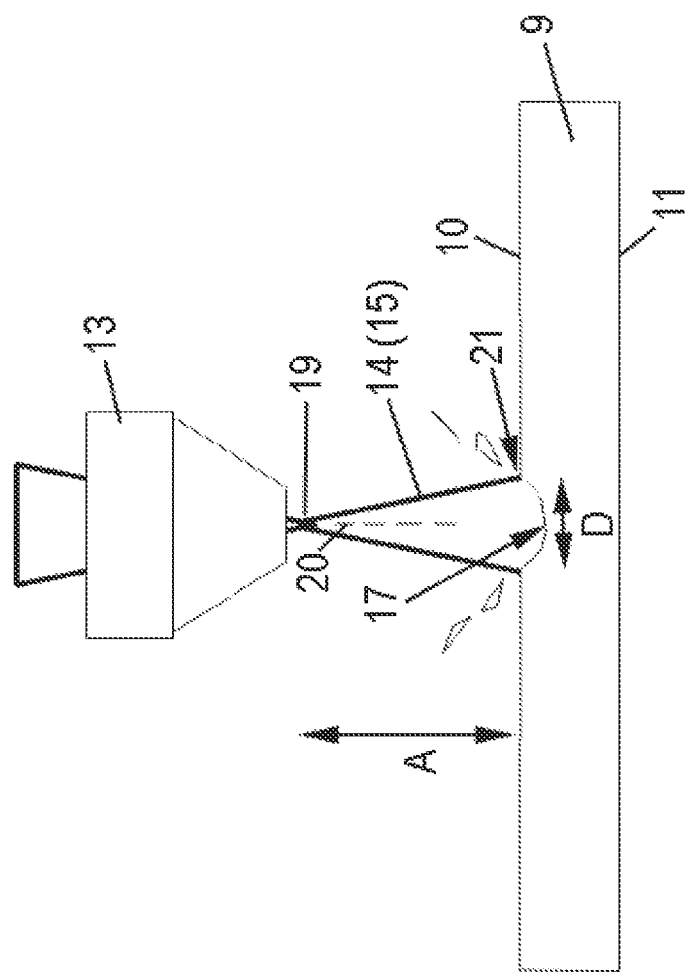
FIGS. 2-9 are a series of schematic diagrams that show various embodiments of the methods and systems according to the present disclosure.

As shown in FIG. 2, the workpiece 9 has two workpiece surfaces 10, 11 opposite one another, with a first workpiece surface 10 facing the beam nozzle 13 and a second workpiece surface 11 facing away from the beam nozzle 13. By the vertical movability of the beam head 3 in the z direction, the working distance of the beam nozzle 13 from the workpiece 9 can be adjusted by changing the distance from the first workpiece surface 10. The distance of the beam head 3 from the first workpiece surface 10 can be adjusted before, during, and after the beam machining. The focal position of the machining beam 14 can be adjusted by changing the distance of the beam nozzle 13 from the first workpiece surface 10 as well as via optical elements in the beam head 3, for example, adaptive optics.

A working gas jet 15 (not shown in detail in the figures) is used to drive the melt out of the kerf and the trough. The working gas jet 15 can be generated by a gas jet generation device (not shown). The inert working gas used is, for example, helium (He), argon (Ar), or nitrogen ($N_2$). Oxygen ($O_2$) is usually used as a reactive working gas. The use of gas mixtures is also known and can be used herein. The working gas jet 15 emerges from the beam nozzle 13 and is guided coaxially with the machining beam 14 to the machining point and, there, strikes the first workpiece surface 10 of the workpiece 9 with an (initial) gas pressure specified by the gas jet generation device.

As shown in FIG. 1, the flat workpiece support 5 includes, for example, a plurality of support elements with, for example, triangle-shaped support point tips, which, together, define a support plane for the workpiece 9 to be machined. Here, the support elements are implemented, for example, as elongated support webs that extend in each case along the y direction and are arranged adjacent one another with, for example, constant spacing in a parallel arrangement along the x direction. Not shown in detail is a suction device through which cutting smoke, slag particles, and small waste particles created during the jet cutting process can be suctioned off A programmatically controlled control device 12 is used for controlling/regulating the method according to the present disclosure for beam machining of the workpiece 9 in the beam machining device 1. The control device 12 can include at least one processor and at least one non-transitory machine readable storage medium coupled to the at least one processor having machine-executable instructions stored thereon that, when executed by the at least one processor, cause the at least one processor to control/regulate the method according to the present disclosure. The at least one processor can be implemented by special purpose logic circuitry, e.g., an FPGA (field programmable gate array) or an ASIC (application specific integrated circuit), or any other type(s) of processor(s) or controller(s).

Reference is now made to FIGS. 2 to 9, which illustrate different embodiments of the methods according to the present disclosure for beam machining a workpiece 9 using the beam device 1 of FIG. 1. For the purpose of simplified illustration and as sufficient for understanding the present disclosure, only the beam nozzle 13 and the machining beam 14 emerging from the beam nozzle 13 are shown in combination with the workpiece 9 in these figures.

FIG. 2 shows the plate-shaped workpiece 9 with the two mutually parallel, flat workpiece surfaces 10, 11 and the beam nozzle 13. An (upper) first workpiece surface 10 faces the beam nozzle 13. The (lower) second workpiece surface 11 faces away from the beam nozzle 13. The machining beam 14 emerging from the beam nozzle 13 (as well as the working gas jet 15, not shown in detail) strike the first workpiece surface 10. The machining beam 14 is implemented in the form of a beam cone with a central beam axis 20 and is focused in a focus 19. The central beam axis 20, which corresponds to the axis of symmetry of the beam cone, is directed perpendicular to the first workpiece surface 10. The beam nozzle 13 has a relatively large working distance A from the first workpiece surface 10 and the focus 19 is situated near the beam nozzle 13, with the workpiece 9 situated in the divergent region of the machining beam 14, resulting in a relatively wide beam spot 21 having a relatively large beam diameter D on the workpiece 9 or the first workpiece surface 10.

The beam diameter D is measured perpendicular to the beam axis 20 and at that point where the machining beam 14 strikes the workpiece 9. The focal position and thus the beam diameter D are selected such that the power density on the workpiece 9 of the machining beam 14 is relatively low and the machining beam 14 merely creates a trough 17 and the workpiece 9 is not penetrated (non-separating machining).

During creation of the trough 17, the machining beam 14 or the beam nozzle 13 is moved in a (e.g., horizontal) plane parallel to the plane of the workpiece support 5. The movement of the machining beam 14 during the creation of the trough 17 basically includes at least one horizontal movement component. The movement of the machining beam 14 can be composed of two mutually perpendicular (e.g., horizontal) movement components (x and y directions), whereby the machining beam 14 is moved along a curved path 25, e.g., along an open or closed circular path (see also FIG. 7). The trough 17 thus can have a longish or elongated shape and extends along a rectilinear or curved path 25, e.g., along a closed path, for example, a circular closed path. The longitudinal shape or the course of the trough 17 can be defined as desired.

At right angles to its extension, the trough 17 can be provided as desired with a defined cross-sectional shape. In some cases, the focal position and thus the beam diameter D can be varied during the creation of the trough 17, to selectively adjust the depth and/or cross-sectional shape of the trough 17. With the reduction of the beam diameter D on the workpiece 9, the trough 17 becomes deeper, e.g., the flanks become steeper, whereas the trough 17 becomes flatter, e.g., the flanks become less steep when the beam diameter D on the workpiece 9 is increased.

Figure 7:
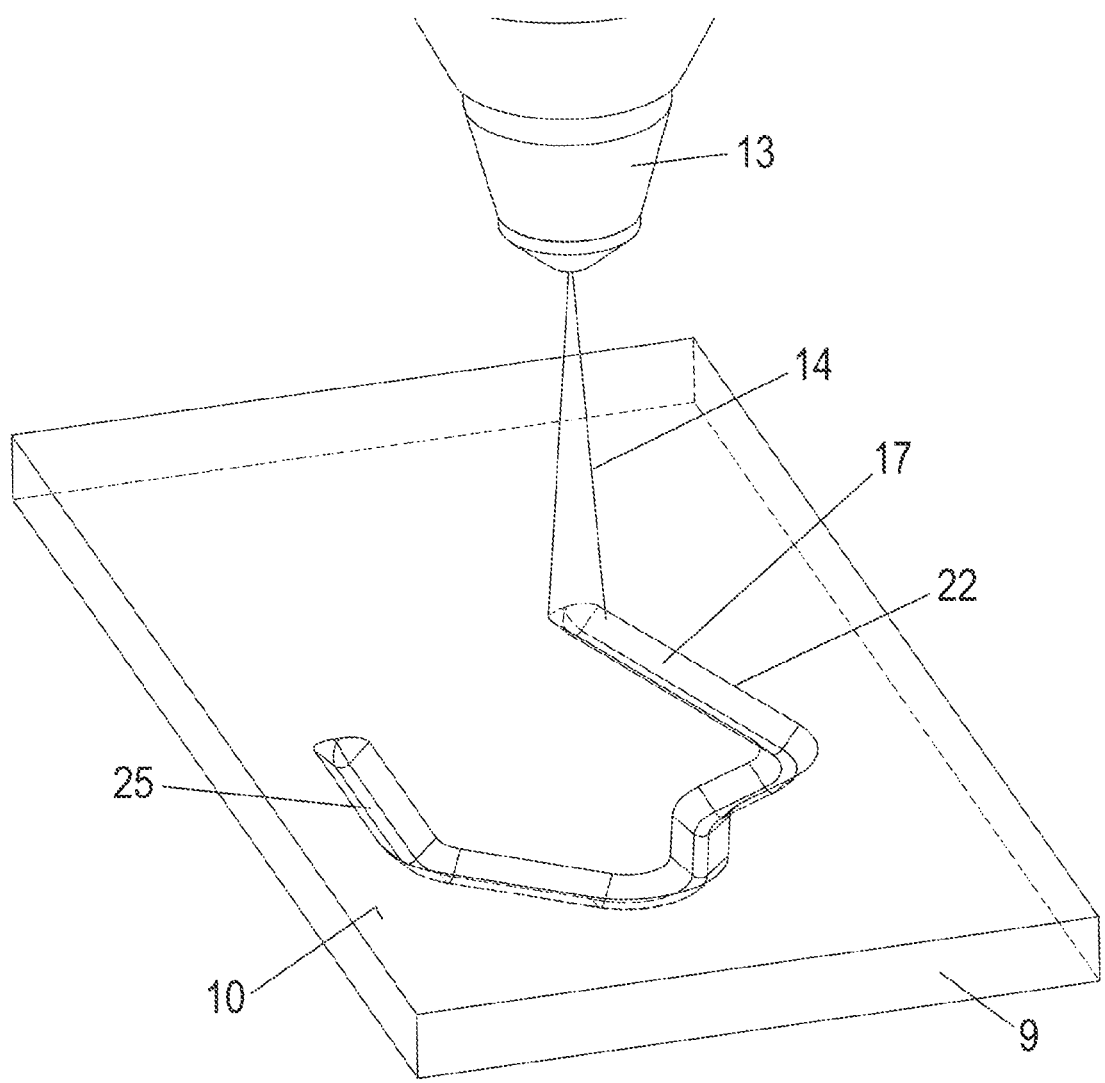

FIG. 7 schematically illustrates the creation of an elongated trough 17 in an exemplary manner. Accordingly, the machining beam 14 is moved along a curved (non-rectilinear) path 25, with the trough 17 being created with a corresponding course.

Figure 3:
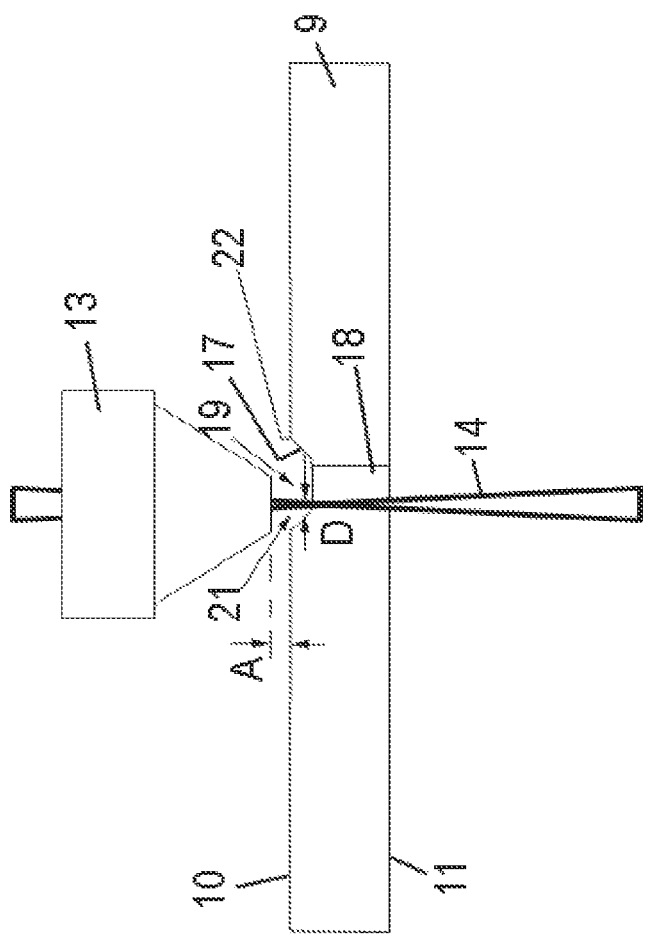

FIG. 3 illustrates, using a representation analogous to FIG. 2, the creation of a gap 18 within the trough 17 of FIG. 7 penetrating the workpiece 9. The beam head 3 or the beam nozzle 13 has, for this purpose, been moved toward the first workpiece surface 10 (in the vertical direction) such that, compared to the production of the trough 17, there is a substantially smaller working distance A between the beam nozzle 13 and the first workpiece surface 10. The working distance A for producing the gap 18 is, for example, at least 6 times smaller, e.g., at least 10 times smaller, than the working distance A for creating the trough 17. In a corresponding manner, the beam spot 21 and the beam diameter D on the workpiece are substantially smaller. For example, the cross-sectional area of the beam spot 21 on the workpiece is at least 6 times smaller, e.g., at least 10 times smaller. The focus 19 of the machining beam 14 is situated within the workpiece 9. The beam diameter D for creating the gap 18 can be dimensioned such that the power density of the machining beam 14 on the workpiece 9 results in a separating machining (penetration) of the workpiece 9.

Figure 8:
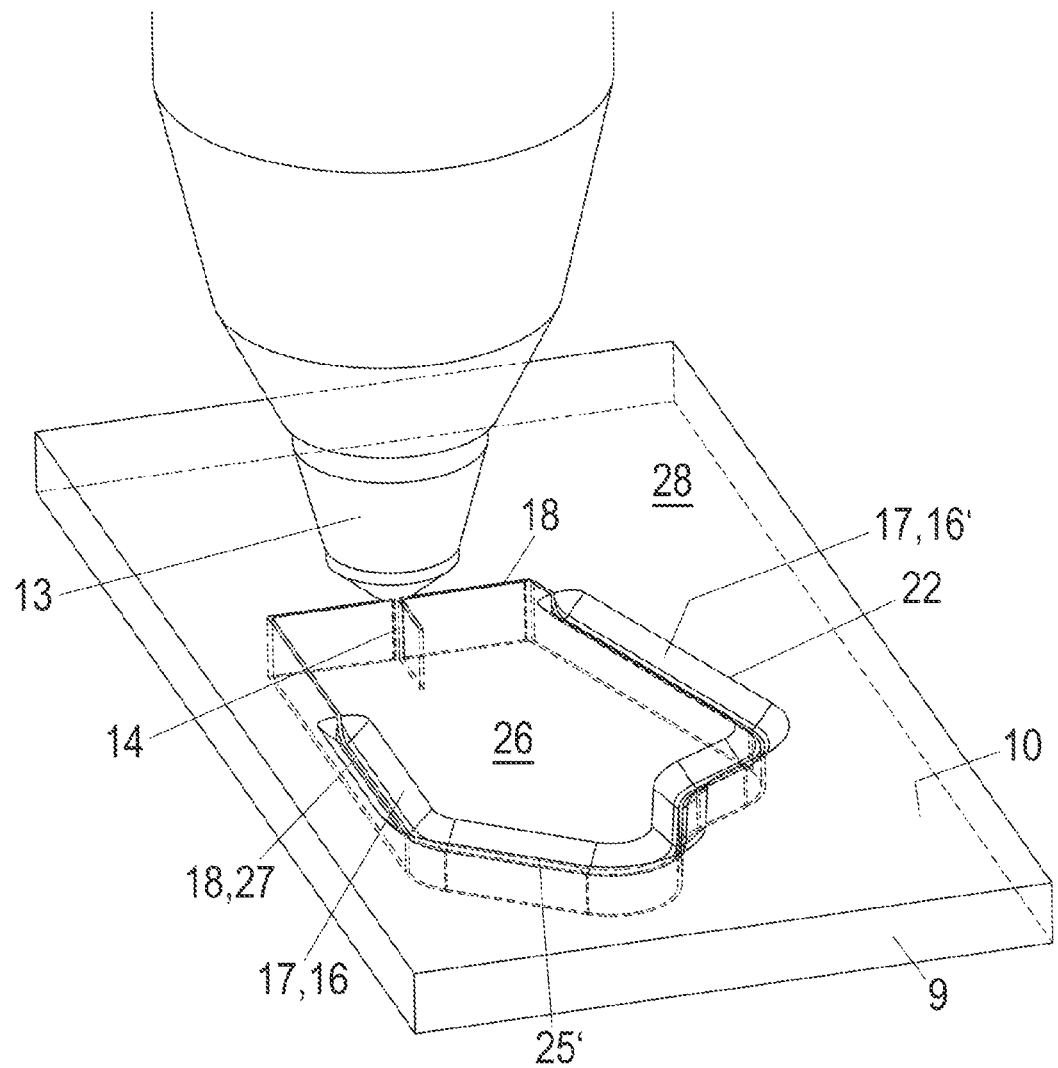

FIG. 8 shows that during creation of the gap 18, the machining beam 14 is moved in a plane parallel (e.g., horizontal) to the plane of the workpiece support 5. The movement of the machining beam 14 during creation of the gap 18 includes two mutually perpendicular (e.g., horizontal) movement components (x and y directions), whereby the machining beam 14 is moved along a curved path 25', creating the gap 18. The gap 18 is created along the (imaginary) contour 27 of a workpiece part 26 to be separated from the workpiece 9. Here, the contour 27 has, for example, a non-linear and a non-round course, although a circular course would be equally possible. In a corresponding manner, the trough 17 was also created along a section of the contour 27 of the workpiece part 26. As illustrated in FIG. 8, the trough 17 does not extend along the entire contour 27, but rather only along a section thereof.

The gap 18 is created within the trough 17 and extends beyond it. The gap 18 has a longish or elongated shape. The longitudinal shape or course of the gap 18 can be defined as desired, with the proviso that the gap 18 always follows the contour 27 and is formed at least within the trough 17. Within the trough 17, the course of gap 18 corresponds to the course of the trough 17.

During the creation of the trough 17 and the gap 18, the paths 25, 25' are, for example, arranged identically or equidistantly. As illustrated in FIG. 8, during the creation of the gap 18, the machining beam 14 is guided beyond the trough 17 and the gap 18 is closed such that the workpiece part 26 (inner slug) is cut free out of the workpiece 9. By separating the workpiece part 26 from the rest of the workpiece, e.g., the scrap skeleton 28, an opening or hole 29 is created in the scrap skeleton 28.

In a variant not shown, the trough 17 could have, for example, a circular closed course, with the gap 18 following the course of the trough 17, consequently, also having a circular closed course. In this case, a circular or disk-shaped workpiece part 26 would be cut out of the workpiece 9 such that a circular hole 29 is created in the scrap skeleton 28.

It would also be conceivable for the workpiece part 26 not to be completely cut out (cut free) by the machining beam 14, but, instead, for one or a plurality of webs (e.g., microjoints) to remain between the workpiece part 26 and the scrap skeleton 28. The webs could be severed by the machining beam 14 or otherwise to remove the workpiece part 26 from the scrap skeleton 28. For example, the workpiece part 26 could be broken out of the workpiece 9.

The shape of the trough 17 and the shape of the gap 18 are selected such that, relative to a direction perpendicular to the extension of the trough 17, the gap 18 is always arranged within the trough 17. Here, the gap 18 is created in a path parallel to the trough 17, with the path 25 for creating the trough 17 and the path 25' for creating the gap 18 having an identical or equidistant course. As illustrated in FIG. 8, the gap 18 is arranged centered relative to a direction perpendicular to the extension of the trough 17, for example. In this case, the path 25 for creating the trough 17 and the path 25' for creating the gap 18 are, for example, identical.

In the region of the trough 17, the gap 18 is created within the trough 17, with the machining beam 14 guided such that the beam spot 21 for creating the gap 18 is situated only within the trough 17. The trough 17 is delimited or bordered by a (closed) trough edge 22 at the first workpiece surface 10. The trough 17 is a depression or indentation of the workpiece 9 at the first workpiece surface 10. The trough edge 22 is defined as that region of the workpiece 9 where the trough 17 begins to deepen toward the interior of the workpiece 9.

The beam spot 21 and thus the gap 18 created can be spaced away from the trough edge 22, relative to a direction perpendicular to the extension of the trough 17 (e.g., viewed perpendicular through the plane of the first workpiece surface 10), e.g., the gap 18 can have a non-zero distance from the trough edge 22, relative to a direction perpendicular to the extension of the trough 17.

In some embodiments, the gap 18 is centered within the trough 17, relative to a direction perpendicular to the extension of the trough 17, having a constant shortest distance from the trough edge 22. The gap 18 is situated, viewed perpendicular through the flat first workpiece surface 10, relative to a direction perpendicular to the extension of the trough 17 within the trough 17, e.g., relative to a (perpendicular) projection of the gap 18 and the trough 17 into the plane of the first workpiece surface 10. The trough 17 deepens toward the gap 18, with the gap 18 arranged in the bottom of the trough 17.

The trough 17 can be a rounding of the cut edge of the gap 18. In some embodiments, the trough 17 is implemented such that it is a chamfer of the gap 18. In some embodiments, the gap 18 is implemented as a closed gap, e.g., as a circular closed gap (annular gap) such that a hole remains in the workpiece 9. The gap 18 (or hole) can then serve for securing a workpiece part to be cut out of the workpiece 9, which has the gap 18 (or hole), where a screw or rivet head can be countersunk in the remaining vestige of the trough 17, which serves as a chamfer.

The trough 17 has a trough section 16' on the scrap skeleton side and a trough section 16 on the workpiece part side.

Figure 9:
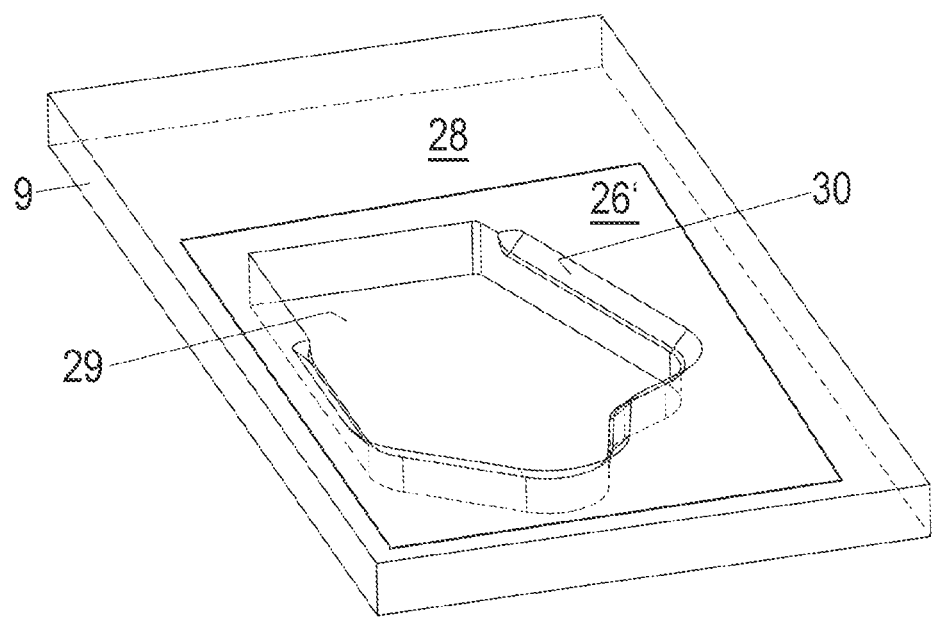

FIG. 9 shows the scrap skeleton 28 with the hole 29 after removal of the workpiece part 26. The scrap skeleton 28 has, at the hole 29, the trough section 16' of the trough 17 remaining on the scrap skeleton 28 (the other trough section 16 is situated on the removed workpiece part 26). The trough section 16' can, for example, be implemented as a chamfer.

It would also be possible to make the hole 29 circular and to form a completely circumferential trough section 16', for example, in the form of a chamfer. In some embodiments, the hole 29, optionally with one or a plurality of additional holes, within the contour of a larger workpiece part 26', can be cut out by the machining beam 14. FIG. 9 schematically indicates a larger workpiece part 26' by a contour line. In this way, workpiece parts (e.g., without an associated trough) with holes, each of which has a chamfer, can be produced particularly easily. The hole can be used, e.g., for securing the workpiece part subsequently cut out.

Figure 4:
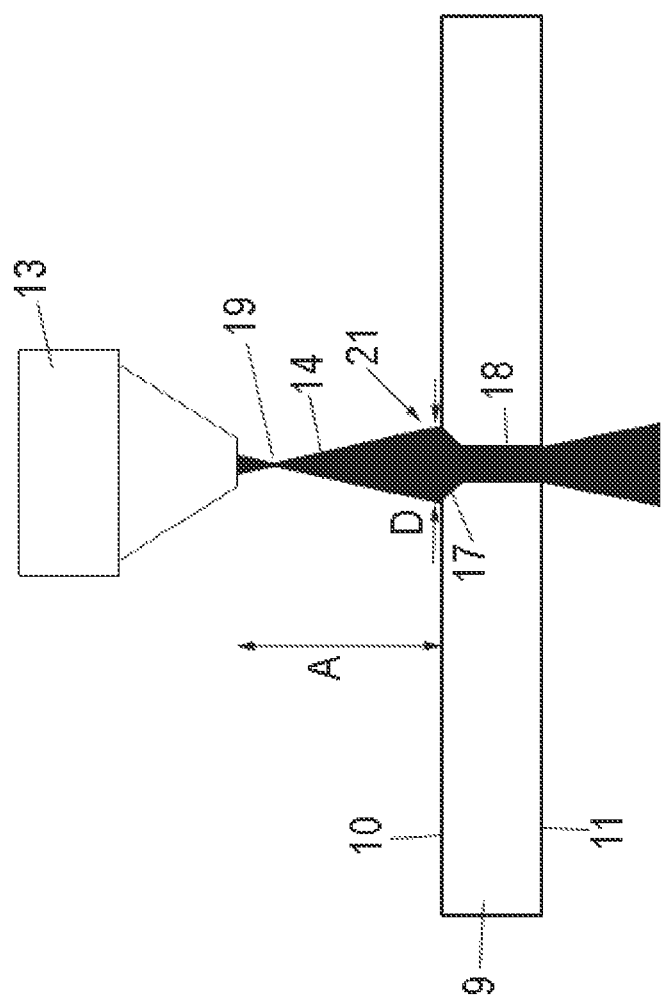
Figure 5:
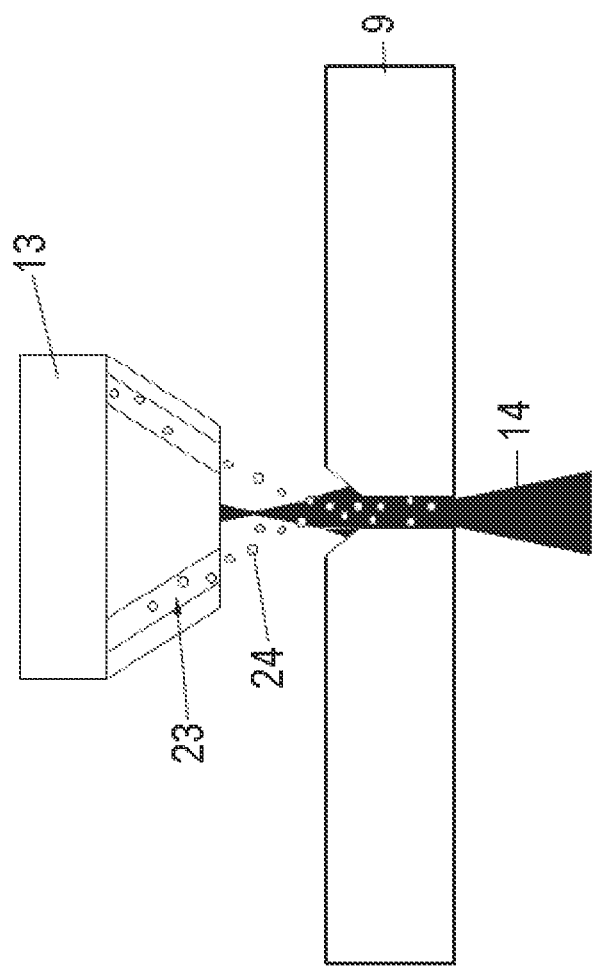
Figure 6:
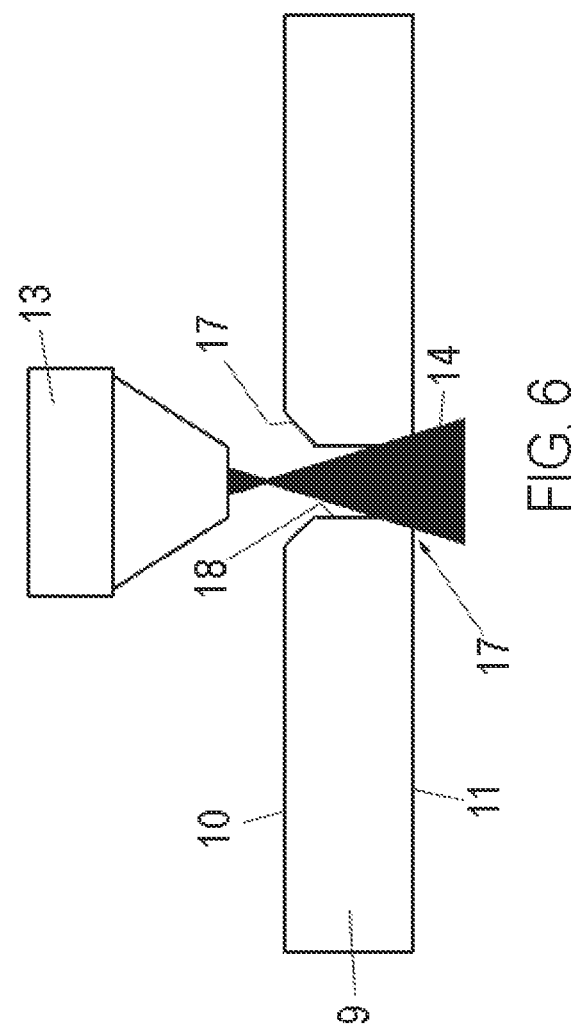

FIGS. 4 to 6 illustrate various further embodiments of the method according to the present disclosure. In each case, these are process steps for post-processing of the gap 18 and the surrounding trough 17.

FIG. 4 illustrates a case in which the distance A between the beam nozzle 13 and the first workpiece surface 10 is relatively large such that the machining beam 14 strikes the first workpiece surface 10 in a relatively large beam spot 21 with a relatively large beam diameter D. The power density of the machining beam 14 at the first workpiece surface 10 is dimensioned (or adjusted) such that the machining beam 14 is non-penetrating and non-joining. During the post-processing operation of FIG. 4, oxide layers are removed from the surfaces of the trough 17 and the gap 18, which layers were created during their manufacture. The oxide layers can well be removed by spalling. The shape and depth of the trough 17 as well as the size of the gap 18 are changed only insignificantly by this.

FIG. 5 illustrates a case in which, in addition to oxide removal, the surfaces of the trough 17 and of the gap 18 are provided with a coating (e.g., a zinc coating). For this purpose, a coating gas jet 23 guided coaxially with the machining beam 14 is directed onto the trough 17 and the gap 18. The coating material 24 (e.g., zinc) is contained in the coating gas jet 23. The coating material 24 is added to the coating gas jet 23, which can completely irradiate the trough 17 and the gap 18, resulting in the deposition of the coating material there and the formation of a coating (e.g., a zinc coating). The distance of the beam nozzle 13 from the first workpiece surface 10 and the focal position can be as in FIG. 4. Reference is made to the descriptions there. The coating can also be carried out as an alternative to the oxide removal.

FIG. 6 illustrates a case in which burr is removed adjacent the second workpiece surface 11 (underside of the workpiece 9) using the machining beam 14. In addition, the cut edges on the workpiece underside of the gap 18 can be rounded. It is also possible, analogously with the first workpiece surface 10 (upper side of the workpiece 9), to create a trough 17, which serves, for example, as a chamfer for the gap 18. The gap 18 thus has, on both workpiece surfaces 10, 11 of the workpiece 9, a chamfer formed in each case by a trough 17. The focal position and the beam diameter for achieving a desired power density of the machining beam 14 must be set accordingly in each case.

The various post-processing operations can be carried out individually or in any combinations. During each post-processing operation, the beam nozzle 13 can be moved parallel to the first workpiece surface 10 (e.g., in at least one horizontal direction) and/or perpendicular to the first workpiece surface 10 (e.g., in a vertical direction). It is likewise conceivable for the beam axis 20 to be pivoted relative to a perpendicular to the first workpiece surface 10.

In the above-described embodiments of the methods according to the present disclosure, a plurality of troughs 17 with a respective gap 18 can be created, whereby one or a plurality of troughs 17 can be formed with a respective gap 18 in a workpiece part 26' that has not yet been cut free. When a plurality of troughs 17 with a respective gap 18 are created in the workpiece 9, it is possible, after the creation of a respective trough 17, to create the gap 18 within the trough 17 immediately thereafter.

However, it is also possible for a plurality of troughs 17 to be created in immediate succession without a gap 18 being created between the creation of two troughs 17, followed by the creation of a gap 18 within a respective trough 17, with the gaps 18 being created in immediate succession without a trough 17 being created between the creation of two gaps 18. Thus, a plurality of troughs 17 are created first, and thereafter the gaps 18 within the troughs 17. When a gap 18 is to be created after the creation of a trough 17, the beam diameter on the workpiece 9 for creating the gap 18 is suitably adjusted (e.g., reduced) for this purpose by changing the focal position.

For example, the focal position can be adjusted by reducing the working distance of the beam head 3 from the workpiece 9 by moving the beam head 3 toward the first workpiece surface 10. When a trough 17 is to be created after the creation of a gap 18, the beam diameter on the workpiece 9 for creating the trough 17 can be suitably adjusted (e.g., increased) for this purpose by changing the focal position. In some cases, the focal position is adjusted by increasing the working distance of the beam head 3 from the workpiece 9 by moving the beam head 3 away from the first workpiece surface 10.

Figure 10:
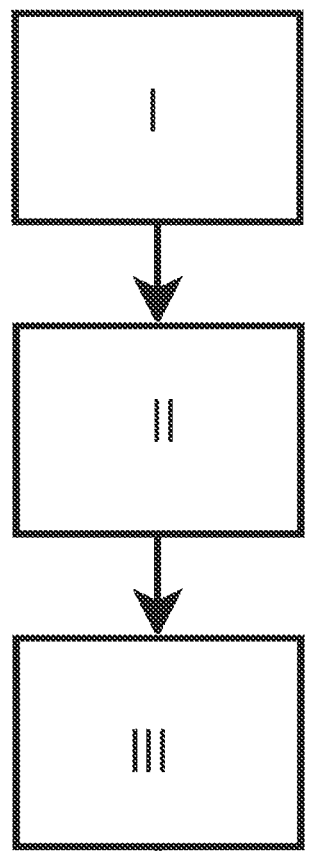
FIG. 10 is a flow chart of one of the methods described herein.

FIG. 10 depicts a flow chart of the method according to the present disclosure.

The method can include three successive steps. These are a first step I, in which at least one trough 17 is created in the workpiece 9 using the machining beam 14; a second step II, in which a focal position of the machining beam 14 is changed such that the machining beam 14 has a smaller beam diameter on the workpiece 9; and a third step III, in which a gap 18 is created inside (and, optionally, additionally outside) a respective trough 17 using the machining beam 14 with the changed focal position.

As is apparent from the above description, the present disclosure provides novel methods for beam machining a workpiece, by which gaps within troughs in a workpiece can be produced simply and economically. For example, holes in the workpiece can be produced with a respective chamfer. It is thus possible to dispense with complex mechanical post-processing of the cut edges, for example, for rounding the cut edges or creating chamfers. The methods as described herein can also be implemented in already existing beam machining devices in a simple manner without having to provide complex technical measures for this purpose. Instead, by merely intervening in the machine control, a desired beam machining of a workpiece can be realized using the methods according to the present disclosure.

LIST OF REFERENCE CHARACTERS 1 beam machining device
2 beam cutting device
3 beam head
4 workbench
5 workpiece support
6 cross member
7 guide carriage
8 machining beam source
9 workpiece
10 first workpiece surface
11 second workpiece surface
12 control device
13 beam nozzle
14 machining beam
15 working gas jet
16, 16' section of trough
17 trough
18 gap
19 focus
20 beam axis
21 beam spot
22 trough edge
23 coating gas jet
24 coating material
25, 25' path
26, 26' workpiece part
27 contour
28 scrap skeleton
29 hole

What is claimed is:

1. A method of beam machining of a workpiece, from which at least one workpiece part is to be separated, using a focused machining beam, the method comprising:
   creating a trough in the workpiece using the focused machining beam by moving the focused machining beam along at least one section of a contour of the at least one workpiece part to be separated from the workpiece, wherein the trough is elongated and extends along a length of the at least one section of the contour;
   altering a focal position of the machining beam such that the machining beam has a smaller beam diameter on the workpiece; and
   creating a gap in the workpiece by moving the machining beam with the altered focal position along a path corresponding to the at least one section of the contour of the at least one workpiece part to be separated from the workpiece, wherein the gap is created at least partially within the trough,
   wherein creating the gap in the workpiece comprises at least one of:
   i) creating a closed gap along the path corresponding to the contour of the at least one workpiece part to cut the at least one workpiece part free, or
   ii) creating a gap interrupted by at least one web along the contour of the at least one workpiece part,
   wherein, by separating the at least one workpiece part from the workpiece, the at least one workpiece part is cut free out of the workpiece such that a hole is created in a remaining part of the workpiece.

2. The method of claim 1, wherein, after separating the at least one workpiece part from the workpiece, at least one of a trough section remaining on the workpiece or a trough section remaining on the at least one workpiece part is in a form of a chamfer.

3. The method of claim 1, wherein altering the focal position of the machining beam comprises reducing a working distance of a beam head guiding the machining beam from the workpiece.

4. The method of claim 1, wherein the trough and the gap are created using the machining beam in a continuous wave operation.

5. The method of claim 1, wherein at least one of a power density or a focal position of the machining beam is changed during the creation of the trough.

6. The method of claim 1, further comprising performing at least one post-processing operation on at least one of the trough or the gap using the machining beam.

7. The method of claim 6, wherein the at least one post-processing operation comprises at least one of:
removing an oxide layer on the at least one of the trough or the gap,
removing burrs in the at least one of the trough or the gap,
heat treating of the at least one of the trough or the gap, or
coating of the at least one of the trough or the gap with a coating material contained in a coating gas jet.

8. The method of claim 6, wherein, for the at least one post-processing operation, the machining beam has a power density on the workpiece that is adjusted such that the workpiece is machined in a non-severing and non-joining manner.

9. The method of claim 1, further comprising creating, through the gap, a second trough in a second workpiece surface of the workpiece parallel to the workpiece surface using the machining beam.

10. The method of claim 1, wherein, through the workpiece surface at least in a direction perpendicular to an extension of the trough, a shortest distance between the gap and a trough edge delimiting the trough is at least 0.5 mm.

11. The method of claim 1, further comprising:
before separating a workpiece part from the workpiece, creating a second trough within the workpiece part along at least one section of a contour of at least one further workpiece part, and
creating a second gap at least within the second trough.

12. The method of claim 11, further comprising, in the workpiece part to be separated from the workpiece, creating at least one hole partially or completely surrounded by a section of a trough.

13. The method of claim 1, further comprising separating the at least one workpiece part from the workpiece by
severing or burning through the at least one web using the machining beam or
breaking the at least one workpiece part out of the workpiece.

14. The method of claim 1, wherein the path has an identical or equidistant course with respect to the at least one section of the contour.

15. A beam machining device comprising:
a beam head configured to guide a machining beam; and
an electronic control device configured to control beam machining of a workpiece, from which at least one workpiece part is to be separated, using a focused machining beam, wherein the electronic control device is configured to control operations comprising:
creating a trough in the workpiece using the machining beam by moving the focused machining beam along at least one section of a contour of the at least one workpiece part to be separated from the workpiece, wherein the trough is elongated and extends along a length of the at least one section of the contour;
altering a focal position of the machining beam such that the machining beam has a smaller beam diameter on the workpiece; and
creating a gap in the workpiece by moving the machining beam with the altered focal position along a path corresponding to the at least one section of the contour of the at least one workpiece part to be separated from the workpiece, wherein the gap is created at least partially within the trough,
wherein creating the gap in the workpiece comprises at least one of:
i) creating a closed gap along the path corresponding to the contour of the at least one workpiece part to cut the at least one workpiece part free, or
ii) creating a gap interrupted by at least one web along the contour of the at least one workpiece part,
wherein, by separating the at least one workpiece part from the workpiece, the at least one workpiece part is cut free out of the workpiece such that a hole is created in a remaining part of the workpiece.

16. A non-transitory computer-readable storage medium coupled to at least one processor and storing programming instructions for execution by the at least one processor, wherein the programming instructions instruct the at least one processor to control operations of beam machining of a workpiece, from which at least one workpiece part is to be separated, using a focused machining beam, the operations comprising:
creating a trough in the workpiece using the machining beam by moving the focused machining beam along at least one section of a contour of the at least one workpiece part to be separated from the workpiece, wherein the trough is elongated and extends along a length of the at least one section of the contour;
altering a focal position of the machining beam such that the machining beam has a smaller beam diameter on the workpiece; and
creating a gap in the workpiece by moving the machining beam with the altered focal position along a path corresponding to the at least one section of the contour of the at least one workpiece part to be separated from the workpiece, wherein the gap is created at least partially within the trough,
wherein creating the gap in the workpiece comprises at least one of:
i) creating a closed gap along the path corresponding the contour of the at least one workpiece part to cut the at least one workpiece part free, or
ii) creating a gap interrupted by at least one web along the contour of the at least one workpiece part,
wherein, by separating the at least one workpiece part from the workpiece, the at least one workpiece part is cut free out of the workpiece such that a hole is created in a remaining part of the workpiece.

* * * * *